R. F. CORLESS.
INNER TUBE FOR TIRES.
APPLICATION FILED JULY 19, 1921.

1,389,815. Patented Sept. 6, 1921.

Inventor
R. F. Corless

UNITED STATES PATENT OFFICE.

REUBEN F. CORLESS, OF COLLEGE PARK, GEORGIA.

INNER TUBE FOR TIRES.

1,389,815.　　　　Specification of Letters Patent.　　Patented Sept. 6, 1921.

Application filed July 19, 1921. Serial No. 485,820.

*To all whom it may concern:*

Be it known that I, REUBEN F. CORLESS, a citizen of the United States, residing at College Park, in the county of Fulton and State of Georgia, have invented certain new and useful Improvements in Inner Tubes for Tires, of which the following is a specification.

This invention relates to inner tubes for automobile tires and more particularly to the type known as compression tubes.

It is the present practice to form inner tubes of this type of substantially uniform thickness throughout the cross-sectional circumference of the tube. The reason for this is that when the tube is inflated each individual portion of the tube under compression seeks to expand and creep toward the point of least resistance. It is therefore necessary to make the tube of substantially uniform thickness in order that there will be no points of least resistance. At the same time, it is only necessary and desirable that the outer or tread portion of the inner tube be relatively thick on account of the wear to which it is subjected, and it will therefore be obvious that a considerable amount of rubber is used in such a tire which serves no other purpose than to equalize the compression within the rubber throughout the inner tube.

It is also well known by manufacturers of this type of inner tube that the tubes can be made only slightly larger than the inside of the casing in which it is to be used as the inflation of the inner tube has a tendency to cause folds in the outer portion of the inner tube which result in splitting the rubber and causing blow-outs.

An important object of the present invention is to provide an inner tube of the compression type wherein only the outer or tread portion of the tube is formed relatively thick, and the inner portion relatively thin, means being provided to prevent lateral and circumferential creeping of the inner tube when inflated.

A further object of the invention is to form such a tire in which the tendency of the rubber to fold and split is eliminated.

Other objects and advantages of the invention will be apparent from the following description.

Figure 1:
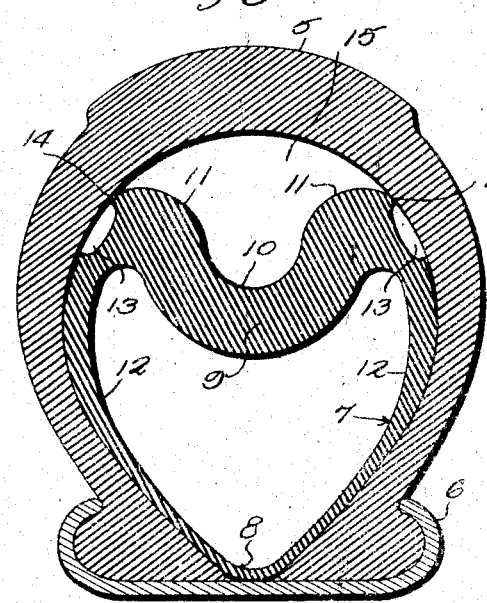
Figure 2:
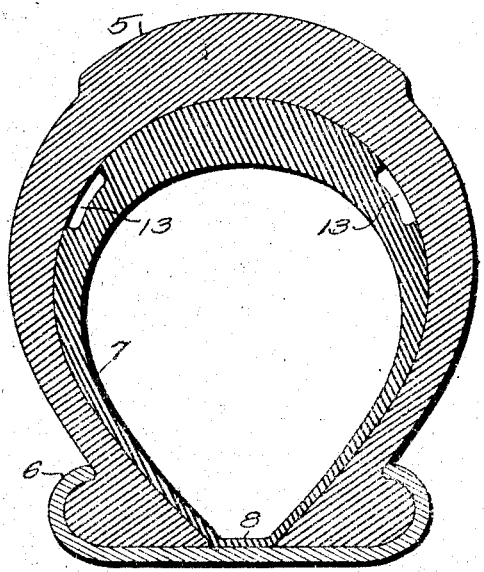
Figure 3:
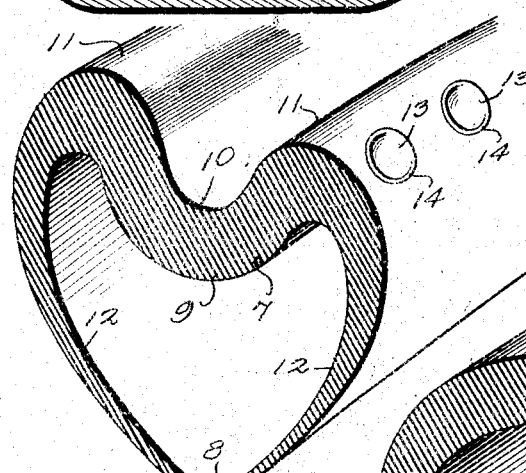
Figure 4:
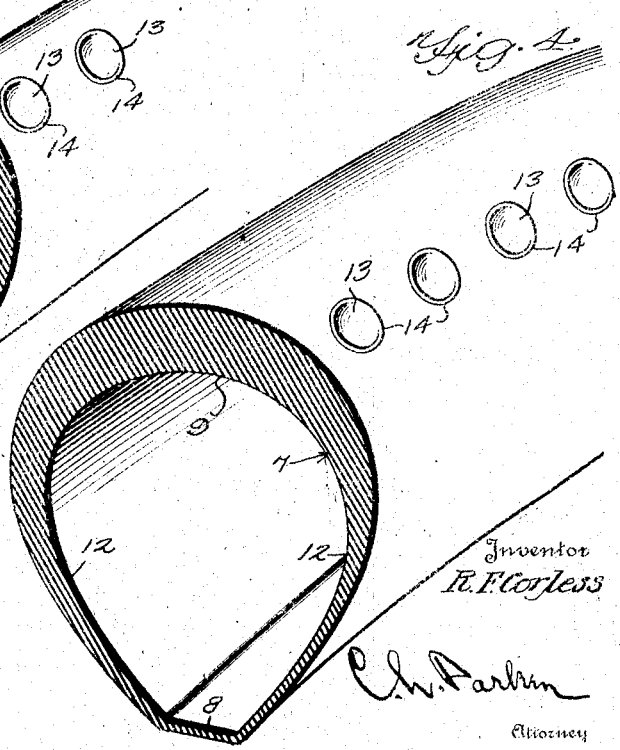

In the drawings, forming a part of this specification and in which like numerals are employed to designate like parts throughout, Figure 1 is a transverse sectional view of a tire and rim showing the tube applied thereto deflated, Fig. 2 is a similar view showing the tube inflated, Fig. 3 is a fragmentary sectional perspective view of a portion of the inner tube deflated, and Fig. 4 is a similar perspective view showing the tube inflated.

In the drawings, wherein for the purpose of illustration is shown a preferred embodiment of my invention, the numeral 5 designates a tire casing mounted upon a suitable rim 6, the casing and rim being of any well known or preferred type.

My invention comprises an inner tube designated as a whole by the reference numeral 7. As shown, the inner portion 8 of the tire is relatively thin, being of substantially the same thickness as the ordinary inner tube now commonly in use. The tube increases in thickness outwardly, as shown, the tread portion 9 being relatively thick. In its manufacture, the tube is molded with a circumferential groove 10 formed substantially centrally of the tread portion of the tube, and from the groove 10 the tube curves outwardly as at 11 to join the side walls 12. It will be understood that the above described positions of the portions of the tire are such when the tire is deflated.

A pair of rows of vacuum cups 13 are arranged circumferentially of the tire on opposite sides of the center thereof and these vacuum cups have their edges provided with small raised beads 14 for a purpose to be described. As shown in Fig. 1, when the tire is in the deflated position, there is an annular space 15 formed between the inner tube and the casing, and the vacuum cups are arranged so that when the inner tube is in the position shown, only the bead 14 separates the vacuum cups from the annular space between the tire casing and the tube.

As previously stated, the tread portion of the inner tube is relatively thick and this thickness decreases outwardly and downwardly so that as shown, the thickness of the rubber at the outer and lower portions of the vacuum cups is much less than at the upper and inner portions of the cups.

The operation of my device is as follows:

The inflation of the tire is accomplished in the usual manner by a valve (not shown). As clearly shown in Fig. 1, the thinnest portions of the tire not already in contact with the inner face of the casing are those portions adjacent the lower and outer ends of the vacuum cups, and as the air pressure increases within the tire it will be obvious that these thin portions will be forced outwardly exhausting air from the vacuum cups, the air being permitted to freely escape from the upper portions of the cups. As the pressure increases within the tire the tread portion 9 of the tube will be gradually forced outwardly against the casing. As shown in Fig. 1 the distance around the inner face of the casing between the upper and inner ends of the vacuum cups is substantially less than the distance around the outer face of the tread portion of the inner tube between the same points. It thus will be obvious that when the tread portion of the inner tube reaches the inflated position the tread rubber will be under substantially high compression whereby any punctures occurring in the inner tube will be immediately closed.

The vacuum cups serve to grip tightly against the inner face of the casing and effectually prevent the tube from creeping longitudinally and also prevent the tread rubber from expanding laterally to seek the point of least resistance as would normally occur, due to the graduated thickness of the inner tube.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having described my invention, I claim:

1. An inner tube for tires, having its tread portion provided with a groove and vacuum cups arranged on opposite sides of said groove.

2. An inner tube for tires, having a relatively thick tread portion and a relatively thin inner portion, said tube being provided on opposite sides of the center with spaced rows of vacuum cups.

3. An inner tube for tires, having a relatively thick tread portion forming a circumferential groove, said tube being provided on opposite sides of said groove with rows of vacuum cups.

4. An inner tube for tires, having a relatively thick tread portion forming a circumferential groove and a relatively thin inner portion, said tube being provided on opposite sides of said groove with rows of vacuum cups having raised edges, said tube being thinner at their outer portions than at the inner portions of said vacuum cups.

5. In a device of the character described, a casing having a smooth inner surface, and an inflatable tube mounted in said casing, said tube being relatively thin at its inner portion and having a relatively thick tread portion forming a circumferential groove whereby a space is formed between said casing and said tube when the latter is deflated, said tube being provided on opposite sides of said groove with rows of vacuum cups having raised edges, said tube being relatively thin at the outer portions and relatively thick at the inner portions of said cups, said tube being adapted to contact said casing adjacent the inner edges of said vacuum cups.

In testimony whereof I affix my signature in presence of two witnesses.

REUBEN F. CORLESS.

Witnesses:
NELSON WILLIS,
PAUL E. CASTLEBURY.